United States Patent [19]

Vannby et al.

[11] Patent Number: 5,496,530
[45] Date of Patent: Mar. 5, 1996

[54] PROCESS FOR THE PREPARATION OF CARBON MONOXIDE RICH GAS

[75] Inventors: Rickard Vannby, Hellerup; Charlotte S. Nielsen, Holte, both of Denmark

[73] Assignee: Haldor Topsøe A/S, Denmark

[21] Appl. No.: 164,029

[22] Filed: Dec. 8, 1993

[30] Foreign Application Priority Data

Dec. 10, 1992 [DK] Denmark .................. 1489/92

[51] Int. Cl.$^6$ .................. C01B 31/18; C01B 3/12; C01B 3/16; C07C 1/12
[52] U.S. Cl. .................. 423/418.2; 423/220; 423/655; 585/733
[58] Field of Search .................. 423/418.2, 220, 423/655; 585/733

[56] References Cited

U.S. PATENT DOCUMENTS

| | | | |
|---|---|---|---|
| 2,759,805 | 8/1956 | Erickson et al. | 423/418.2 |
| 3,222,147 | 12/1965 | Benson | 423/418.2 |
| 3,479,149 | 11/1969 | Frilette | 423/418.2 |
| 3,919,113 | 11/1975 | Reynolds | 423/655 |
| 4,182,746 | 1/1980 | Myint | 423/418.2 |
| 4,265,868 | 5/1981 | Kamody | 423/418.2 |

*Primary Examiner*—John Zimmerman
*Assistant Examiner*—Peter T. DiMauro
*Attorney, Agent, or Firm*—Ostrolenk, Faber, Gerb & Soffen

[57] ABSTRACT

Process for the preparation of carbon monoxide rich gas comprising reacting a mixed gas of hydrogen and carbon dioxide in the presence of a conversion catalyst to carbon monoxide rich gas, which process further comprises reacting part of the carbon dioxide and hydrogen in the gas feed exothermically to methane simultaneously with the carbon monoxide producing reaction and carrying out both reactions under adiabatic conditions, so that the exothermical methane producing reaction provides necessary heat for the endothermic carbon monoxide producing reaction.

2 Claims, No Drawings

PROCESS FOR THE PREPARATION OF CARBON MONOXIDE RICH GAS

This invention is directed to the preparation of carbon monoxide rich gas. In particular, the invention concerns utilization of carbon dioxide and hydrogen containing off-gases for the preparation of valuable carbon monoxide rich synthesis gas by an economic and energy efficient process.

Carbon monoxide is a useful reactant in a large number of industrial processes. To name a few, carbon monoxide is used in the manufacture of alcohols, carboxylic acids and isocyanates. Carbon monoxide rich gas is, furthermore, required in the reduction of iron ore.

Conventional production methods of carbon monoxide involve catalytic steam reforming of hydrocarbons. The overall reaction proceeding during steam reforming is endothermic and requires heat. The process is carried out usually in a furnace with externally fired tubes loaded with reforming catalyst.

Other conventional routes in carbon monoxide production include gasifying of coal or residuals by partial oxidation with oxygen. Carbon monoxide rich gases are, furthermore, prepared by partial oxidation of light hydrocarbons, including natural gas and naphtha. Alternative autothermal reforming and catalytic partial oxidation may also be used.

Common to all partial oxidation processes is that expensive oxygen is required.

The general object of this invention is to utilize industrial off-gases containing carbon dioxide and hydrogen in the preparation of carbon monoxide rich gas without the need of external energy sources or oxygen.

Accordingly, the invention provides a process for the preparation of carbon monoxide rich gas from a feed stock of hydrogen and carbon dioxide by reaction of hydrogen and carbon dioxide to carbon monoxide. In the process, a part of the carbon dioxide and hydrogen is exothermically converted to methane simultaneously with the carbon monoxide producing reaction. The reactions are carried out under adiabatic conditions in the presence of a conversion catalyst, whereby the exothermic methane producing reaction provides necessary heat for the endothermic carbon monoxide producing reaction.

On contrary to the conventional processes, which include a reformer furnace or a partial oxidation reactor together with fuel and steam systems, the process of the invention is accomplished in relatively simple process equipment. A complete process unit for carrying out the process consists of an adiabatic reactor and a heat exchanger as further described below.

In operating the inventive process, hydrogen and carbon dioxide containing feed gas is mixed in conventional mixing devices. As previously mentioned, both gases are readily available as industrial by-products from a number of processes. Thus, carbon dioxide is practically present in all synthesis gas mixtures based on gasification of hydrocarbons or coal, and is separated therefrom by conventional removal methods, such as scrubbing, pressure swing adsorption and cryogenic separation methods.

Hydrogen is commonly obtained as by-product from purge gas in e.g. petrochemical or ammonia plants by recovery in cryogenic separation, and used as fuel in those plants.

In the process, mixing of the hydrogen and carbon dioxide containing gases may take place in a conventional mixing chamber or in a burner mounted at the top of an adiabatic reactor.

The $H_2/CO_2$ molar ratio in the mixed gas is, thereby, preferably in the range of 1.5 to 6.5. The gases are preheated to a temperature of between 400° C. and 800° C. prior to the mixed gas enters the reactor.

Preheating of the gas may be obtained by heat exchange with a hot process fluid and preferably with the hot product stream, which leaves the adiabatic reactor. The outlet temperature from the reactor is considerable higher than the required inlet temperature of the mixed gas due to the reactions proceeding at adiabatic conditions in the gas.

The adiabatic reactor is operated at a pressure of between 5 and 50 bar. The actual adjustment of the process conditions will, thereby, depend on the desired carbon monoxide concentration in the product gas leaving the reactor.

At the above conditions, the carbon dioxide and hydrogen in the process gas react to carbon monoxide by the endothermic reverse shift reaction

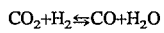
$$CO_2 + H_2 \leftrightarrows CO + H_2O$$

Methane is formed simultaneously by the exothermic reaction

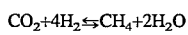
$$CO_2 + 4H_2 \leftrightarrows CH_4 + 2H_2O$$

The exothermic methanation reaction produces sufficient heat to maintain the endothermic reversed shift reaction.

Both reactions proceed to equilibrium in the presence of any conventional reforming catalyst including commercially available nickel, iron oxide, copper or zinc containing catalyst.

The final composition of the product gas leaving the process is controlled by the equilibrium of the above shift and methanation reactions. The actual product composition will, therefore, depend on the process conditions. By varying the $H_2/CO_2$ ratio, the temperature and pressure, at which the mixed gas is introduced into the adiabatic reactor, different product gas compositions can be obtained. Thus, it is possible to obtain different product gas compositions being useful as synthesis gas in different processes.

The process according to the invention may advantageously be applied for capacity improvement in existing carbon monoxide plants, which are equipped with cryogenic units and with carbon dioxide removal units producing hydrogen and carbon dioxide by-products.

Furthermore, by appropriate adjustment of the process conditions the carbon monoxide rich gas from the above process can be used directly as synthesis gas in the preparation of methanol.

Having thus described the invention in general, the above and further features and aspects of the invention will become apparent from the following Example.

EXAMPLE

Hydrogen/carbon dioxide mixed gas is prepared by mixing in a mixing chamber at a pressure of 20.4 bar g, 5000 $Nm^3/h$ hydrogen and 2000 $Nm^3/h$ carbon dioxide.

The mixed gas is preheated to 650° C. by indirect heat exchange in a feed effluent heat exchanger with carbon monoxide rich product gas leaving the reactor for conversion of the mixed gas at an outlet temperature of 804° C. as further described below. By passage through the heat exchanger, the temperature in the mixed gas raises to 650° C., when the gas is introduced into the adiabatic conversion reactor. The reactor is loaded with a fixed bed of conventional nickel containing steam reforming catalyst (available from Haldor Topsøe A/S, Denmark).

By passage through the catalyst, the temperature of the mixed gas increases adiabatically to 804° C. through reactions of hydrogen and carbon dioxide to carbon monoxide and methane as already described hereinbefore.

The composition of the reacted mixed gas leaving the reactor is then as follows:

| | |
|---|---|
| Carbon monoxide | 952 Nm³/h |
| Carbon dioxide | 670 Nm³/h |
| Hydrogen | 2534 Nm³/h |
| Methane | 424 Nm³/h |
| Water | 1709 Nm³/h |

The process according to the invention requires no external heat supply, the heat necessary for maintenance of the carbon monoxide producing reaction is solely provided by the exothermic methanation reaction proceeding simultaneously with the carbon monoxide reaction at adiabatic conditions.

Heat required for preheating the mixed gas is supplied by sensible heat in the carbon monoxide rich gas leaving the reactor at high temperatures.

The temperature of the carbon monoxide rich product gas is 193° C. after heat exchange with the mixed gas. The product gas thus obtained may advantageously be mixed with synthesis gas from a steam reformer. The gas mixture is passed through a $CO_2$-removal unit before final separation of $H_2$ and CO in a cryogenic unit. Carbon dioxide from the removal unit is pressurized and recycled as mixed gas together with hydrogen being in excess from the cryogenic separation unit. Thereby, it is possible to increase the capacity of existing carbon monoxide plants with introduction of a few additional process steps.

We claim:

1. Process for the preparation of carbon monoxide rich product gas comprising reacting a gas feed of hydrogen and carbon dioxide preheated to a temperature between 400° C. and 650° C. in a molar $H_2/CO_2$ ratio of between 1.5 and 6.5 in the presence of a reforming catalyst at a pressure between 5 and 50 bar to carbon monoxide rich gas, which process comprises reacting part of the carbon dioxide and hydrogen in the gas feed exothermically to methane simultaneously with the carbon monoxide producing reaction and carrying out both reactions under adiabatic conditions, so that the exothermic methane producing reaction provides necessary heat for the endothermic carbon monoxide producing reaction, and the outlet temperature of the product gas is higher than the temperature to which the gas is preheated.

2. The process of claim 1, wherein the mixed gas is preheated by heat exchange with the carbon monoxide rich gas leaving the process.

* * * * *